US012065105B2

(12) United States Patent
Marcelino et al.

(10) Patent No.: US 12,065,105 B2
(45) Date of Patent: Aug. 20, 2024

(54) RECONFIGURABLE DIVIDER SYSTEM FOR A PICKUP TRUCK CARGO BOX

(71) Applicant: GM Global Technology Operations LLC, Detroit, MI (US)

(72) Inventors: Andre Stoppa Ferreira Marcelino, São Paulo (BR); Filippo Santolia Junior, São José dos Campos (BR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 390 days.

(21) Appl. No.: 17/518,958

(22) Filed: Nov. 4, 2021

(65) Prior Publication Data
US 2023/0139937 A1 May 4, 2023

(51) Int. Cl.
*B60R 9/06* (2006.01)
*B60P 7/02* (2006.01)

(52) U.S. Cl.
CPC ............... *B60R 9/065* (2013.01); *B60P 7/02* (2013.01)

(58) Field of Classification Search
CPC ............... B60R 9/065; B60R 9/06; B60P 7/02
USPC .................. 224/488, 403; 296/37.6
See application file for complete search history.

(56) References Cited

U.S. PATENT DOCUMENTS

| 431,318 | A | * | 7/1890 | Behrman | ............ | E05B 65/0811 |
| | | | | | | 292/DIG. 29 |
| 1,615,300 | A | * | 1/1927 | Cantrell | ................ | E05B 65/006 |
| | | | | | | 292/256.75 |
| 2,496,944 | A | * | 2/1950 | James | ................ | B62D 33/0273 |
| | | | | | | 292/341.15 |
| 2,985,333 | A | * | 5/1961 | Kirkman | ................ | A47B 88/90 |
| | | | | | | 220/533 |
| 3,023,451 | A | * | 3/1962 | Thoel | ................ | B62D 33/0273 |
| | | | | | | 292/210 |
| 3,765,717 | A | * | 10/1973 | Garvert | ................ | B60J 7/141 |
| | | | | | | 296/100.1 |
| 4,832,394 | A | * | 5/1989 | Macomber | ................ | B60P 7/02 |
| | | | | | | 296/100.06 |
| 5,411,355 | A | | 5/1995 | Gosnell et al. | | |
| 5,597,193 | A | * | 1/1997 | Conner | ................ | B60P 7/14 |
| | | | | | | 410/112 |
| 5,685,593 | A | * | 11/1997 | O'Connor | ................ | B60R 13/01 |
| | | | | | | 224/404 |

(Continued)

FOREIGN PATENT DOCUMENTS

| DE | 202018105115 U1 | 9/2018 |
| DE | 202018104949 U1 | 10/2018 |
| DE | 202019105180 U1 | 10/2019 |

OTHER PUBLICATIONS

German Application No. 10 2022 122 646.8 filed Sep. 7, 2022; German Office Action dated Apr. 28, 2023; 6 pages.

*Primary Examiner* — Nathan J Newhouse
*Assistant Examiner* — Lester L Vanterpool
(74) *Attorney, Agent, or Firm* — CANTOR COLBURN LLP

(57) ABSTRACT

A cargo box for a pickup truck having a divider system includes a first member selectively supported in the cargo box, and a second member selectively supported in the cargo box adjacent the first member. The first and second members are configured to establish one of a first configuration in which the cargo box is fully enclosed and a second configuration in which the cargo box includes a first portion that is fully exposed and a second portion that is fully enclosed.

20 Claims, 10 Drawing Sheets

(56) References Cited

U.S. PATENT DOCUMENTS

| | | | | |
|---|---|---|---|---|
| 5,931,632 | A * | 8/1999 | Dongilli | B60R 9/00 224/404 |
| 5,996,868 | A * | 12/1999 | Paradis | B60R 9/00 224/539 |
| 6,053,545 | A * | 4/2000 | Asmundson | E05C 3/02 292/210 |
| 6,116,673 | A * | 9/2000 | Clonan | B60R 9/00 296/3 |
| 6,234,559 | B1 * | 5/2001 | Block | B60J 7/1621 296/100.06 |
| 6,318,781 | B1 * | 11/2001 | Mc Kee | B60R 9/00 296/37.6 |
| 6,641,013 | B2 * | 11/2003 | Dise | B60R 9/00 83/928 |
| 6,695,375 | B1 * | 2/2004 | May | B60R 11/06 224/403 |
| 6,883,855 | B2 * | 4/2005 | Chverchko | B60J 7/1621 296/100.09 |
| 7,017,977 | B1 * | 3/2006 | Kelter | B60P 7/135 296/182.1 |
| 7,083,219 | B1 * | 8/2006 | Gregory | B60P 1/003 414/522 |
| 7,419,203 | B2 * | 9/2008 | Chandler | B60P 3/14 296/37.6 |
| 8,210,591 | B2 * | 7/2012 | Martin | B60R 9/00 296/100.07 |
| 8,317,442 | B2 * | 11/2012 | Daikuzono | B60P 7/14 410/121 |
| 8,328,248 | B2 * | 12/2012 | Scherr | B62D 33/037 292/196 |
| 8,814,246 | B2 * | 8/2014 | Weller | B62D 33/042 296/57.1 |
| 8,931,819 | B2 * | 1/2015 | Daniel | B60R 9/055 296/37.6 |
| 9,187,044 | B2 | 11/2015 | Bonner et al. | |
| 9,211,834 | B2 * | 12/2015 | Facchinello | B60P 7/02 |
| 9,346,416 | B1 * | 5/2016 | Kim | B60P 7/14 |
| 9,540,050 | B2 * | 1/2017 | Miller | B60J 7/141 |
| 9,682,733 | B2 * | 6/2017 | Krishnan | B60J 7/1607 |
| 9,821,720 | B1 * | 11/2017 | McCauley | B60P 7/00 |
| 10,513,226 | B2 | 12/2019 | Tena Han et al. | |
| 10,821,912 | B1 * | 11/2020 | Onuschak | B60R 11/06 |
| 11,007,949 | B2 * | 5/2021 | Singer | B60P 3/42 |
| 11,066,019 | B2 | 7/2021 | Aguilar Ruelas et al. | |
| 11,148,598 | B1 * | 10/2021 | Eman-Henshaw | B60R 9/06 |
| 2010/0288809 | A1 * | 11/2010 | Martin | B60R 9/00 224/403 |
| 2019/0071022 | A1 | 3/2019 | Barradas Guarneros et al. | |
| 2020/0406828 | A1 | 12/2020 | Simonin et al. | |
| 2022/0055542 | A1 * | 2/2022 | Kane | B60R 11/06 |

* cited by examiner

RECONFIGURABLE DIVIDER SYSTEM FOR A PICKUP TRUCK CARGO BOX

INTRODUCTION

The subject disclosure relates to the art of vehicles and, more particularly, to a reconfigurable divider for a pickup truck cargo box.

Pickup trucks include a cargo bed or box that is exposed to ambient. That is, access to the cargo box is typically unrestricted. Certain users will add a cap or shell to the cargo box. The cap creates a secure area in the cargo box. Other uses may employ a cargo box cover. The cargo box cover may be a soft cover that attaches to the cargo box with snaps and/or hook and loop fasteners, or a hard cover that may include a lock.

While effective at protecting items in the cargo box, the cap imposes a height restriction for items stored in the cargo box. That is, the items must fit under the cap. Similarly, soft, and hard covers impose height restrictions on items stored in the cargo box. Further, the soft cover may be readily removed by unauthorized persons wanting access to the cargo box. Accordingly, it is desirable to provide a cargo box with a system to protect contents while, at the same time, providing flexibility for storing and transporting contents of various sizes.

SUMMARY

In one non-limiting example, a cargo box for a pickup truck having a divider system includes a first member selectively supported in the cargo box, and a second member selectively supported in the cargo box adjacent the first member. The first and second members are configured to establish one of a first configuration in which the cargo box is fully enclosed and a second configuration in which the cargo box includes a first portion that is fully exposed and a second portion that is fully enclosed.

In addition to one or more of the features described herein the cargo box includes a bed, a forward wall, a first side wall, an opposing second side wall and a tail gate pivotally mounted relative to the bed, wherein the tail gate is selectively opened to expose the bed in both the first configuration and the second configuration.

In addition to one or more of the features described herein the first side wall includes a first rail that extends between the forward wall and the tail gate and the second side wall include a second rail that extends between the forward wall and the tail gate, wherein each of the first member and the second member is received in the first and second rails in the first configuration and the first member is slidingly received in the first and second rails in the second configuration.

In addition to one or more of the features described herein the first side wall includes a first channel that extends substantially perpendicularly to the bed and the second wall includes a second channel that extends substantially perpendicularly to the bed, the second member being received between the first channel and the second channel in the second configuration.

In addition to one or more of the features described herein each of the first channel and the second channel are formed in corresponding ones of the first side wall and the second side wall.

In addition to one or more of the features described herein the second member includes a first side surface section supporting a first guide pin element and a second guide pin element, and a second side surface section supporting s third guide pin element and a fourth guide pin element.

In addition to one or more of the features described herein the first and second guide pin elements are arranged in the first rail and the third and fourth guide pin elements are arranged in the second rail when the second member is in the first configuration.

In addition to one or more of the features described herein the first guide pin element is arranged in the first rail and the second guide pin element is arranged in the first channel and the third guide pin element is arranged in the second rail and the fourth guide pin element is arranged in the second channel when the second member is in the second configuration.

In addition to one or more of the features described herein a first lock member arranged on the first side wall adjacent the tail gate and a second lock member arranged on the second side wall adjacent the tail gate.

In addition to one or more of the features described herein the first member includes a first side supporting a first lock receiver and a first guide pin and a second side supporting a second lock receiver and a second guide pin, wherein the first and second lock receivers are configured to interact with corresponding ones of the first and second lock members to constrain the first member to the cargo box.

In another non-limiting example, a pickup truck includes a passenger compartment, a cargo box operatively connected to the passenger compartment, and a divider system selectively positionable in the cargo box. The divider system includes a first member and a second member. The first and second members are configured to establish one of a first configuration in which the cargo box is fully enclosed and a second configuration in which the cargo box includes a first portion that is fully exposed and a second portion that is fully enclosed.

In addition to one or more of the features described herein the cargo box includes a bed, a forward wall, a first side wall, an opposing second side wall and a tail gate pivotally mounted relative to the bed, wherein the tail gate is selectively opened to expose the bed in both the first configuration and the second configuration.

In addition to one or more of the features described herein the first side wall includes a first rail that extends between the forward wall and the tail gate and the second side wall include a second rail that extends between the forward wall and the tail gate, wherein each of the first member and the second member is received in the first and second rails in the first configuration and the first member is slidingly received in the first and second rails in the second configuration.

In addition to one or more of the features described herein the first side wall includes a first channel that extends substantially perpendicularly to the bed and the second wall includes a second channel that extends substantially perpendicularly to the bed, the second member being received between the first channel and the second channel in the second configuration.

In addition to one or more of the features described herein each of the first channel and the second channel are formed in corresponding ones of the first side wall and the second side wall.

In addition to one or more of the features described herein the second member includes a first side surface section supporting a first guide pin element and a second guide pin element, and a second side surface section supporting s third guide pin element and a fourth guide pin element.

In addition to one or more of the features described herein the first and second guide pin elements are arranged in the first rail and the third and fourth guide pin elements are arranged in the second rail when the second member is in the first configuration.

In addition to one or more of the features described herein the first guide pin element is arranged in the first rail and the second guide pin element is arranged in the first channel and the third guide pin element is arranged in the second rail and the fourth guide pin element is arranged in the second channel when the second member is in the second configuration.

In addition to one or more of the features described herein a first lock member arranged on the first side wall adjacent the tail gate and a second lock member arranged on the second side wall adjacent the tail gate.

In addition to one or more of the features described herein the first member includes a first side supporting a first lock receiver and a first guide pin and a second side supporting a second lock receiver and a second guide pin, wherein the first and second lock receivers are configured to interact with corresponding ones of the first and second lock members to constrain the first member to the cargo box.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
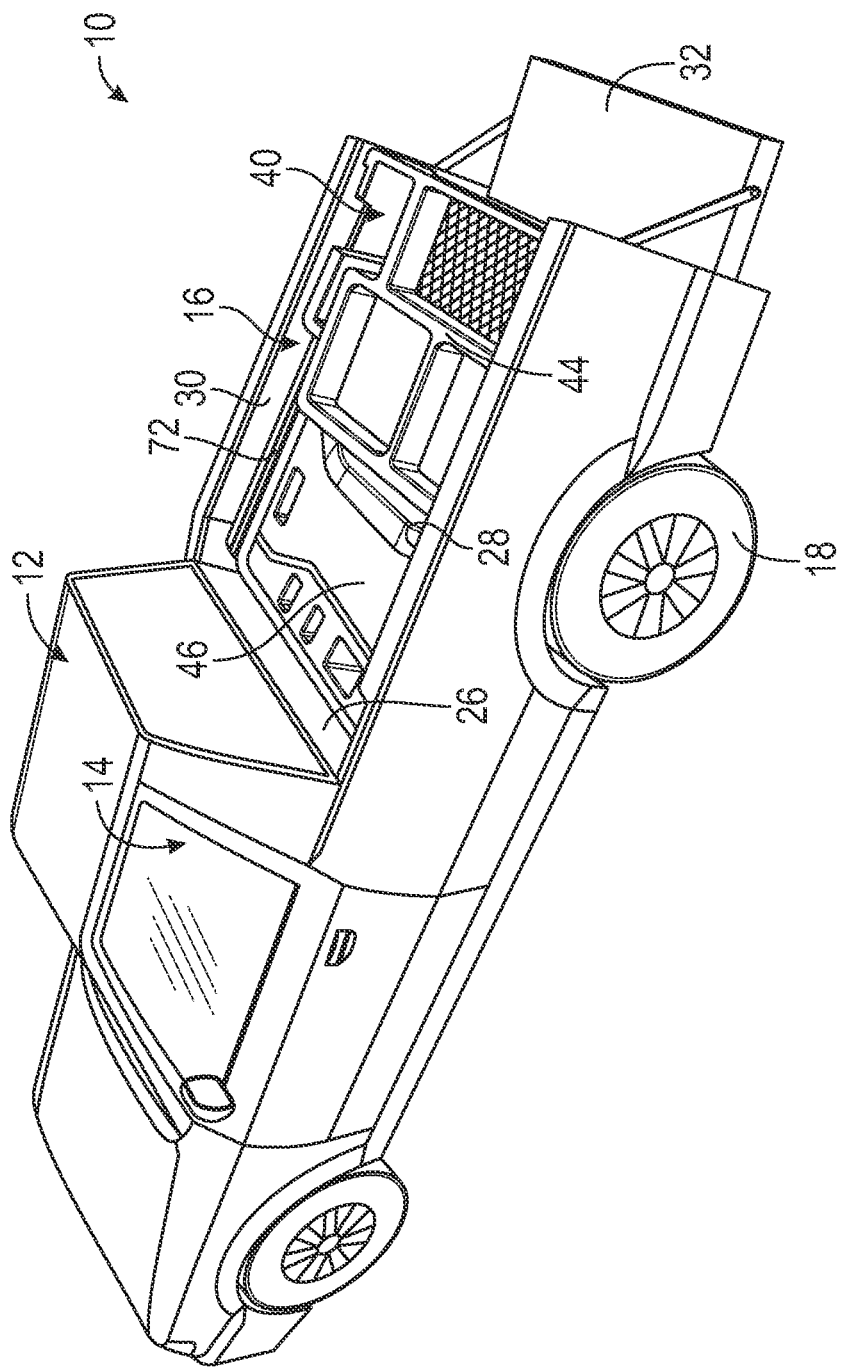
FIG. 1 is an upper left rear view of a pickup truck including a cargo box having a reconfigurable divider system, in accordance with a non-limiting example.

The following description is merely exemplary in nature and is not intended to limit the present disclosure, its application or uses. It should be understood that throughout the drawings, corresponding reference numerals indicate like or corresponding parts and features.

A pickup truck, in accordance with a non-limiting example, is indicated generally at 10 in FIG. 1. Pickup truck 10 includes a body 12 supported on a frame (not shown) that defines a passenger compartment 14 and a cargo box 16. Body 12 is also supported by a plurality of wheels 18. In a non-limiting example, cargo box 16 includes a lower surface or bed 24, FIG. 2, that is surrounded by a forward wall 26, a first side wall 28, a second side wall 30, and a tail gate 32. In a non-limiting example, a divider system 40 is positioned in bed 24. In a non-limiting example, divider system is supported by first side wall 28 and second side wall 30.

Figure 2:
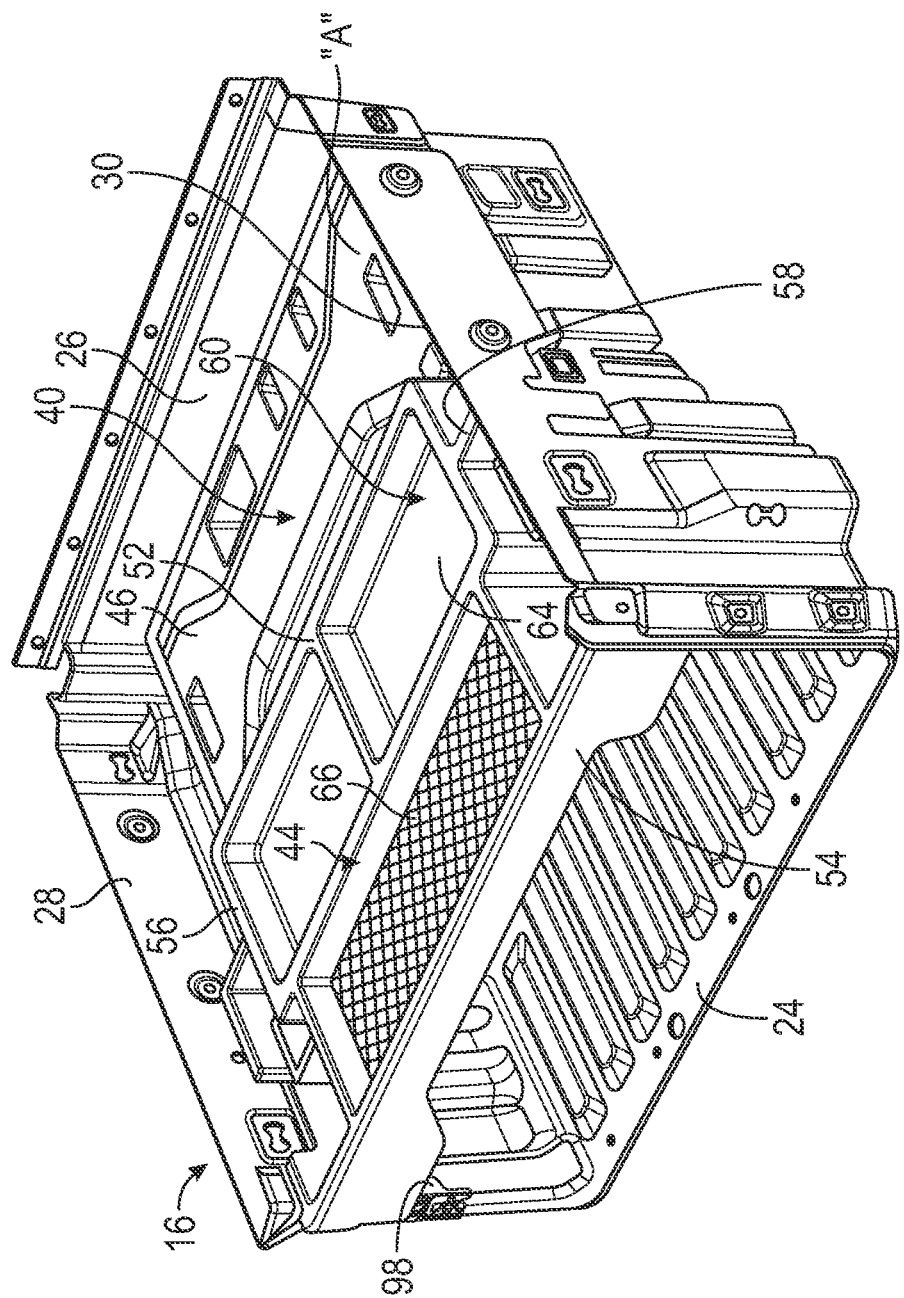
FIG. 2 depicts an upper right rear view of a cargo box of the pickup truck of FIG. 1 showing the reconfigurable divider system in a first configuration, in accordance with a non-limiting example.
Figure 3:
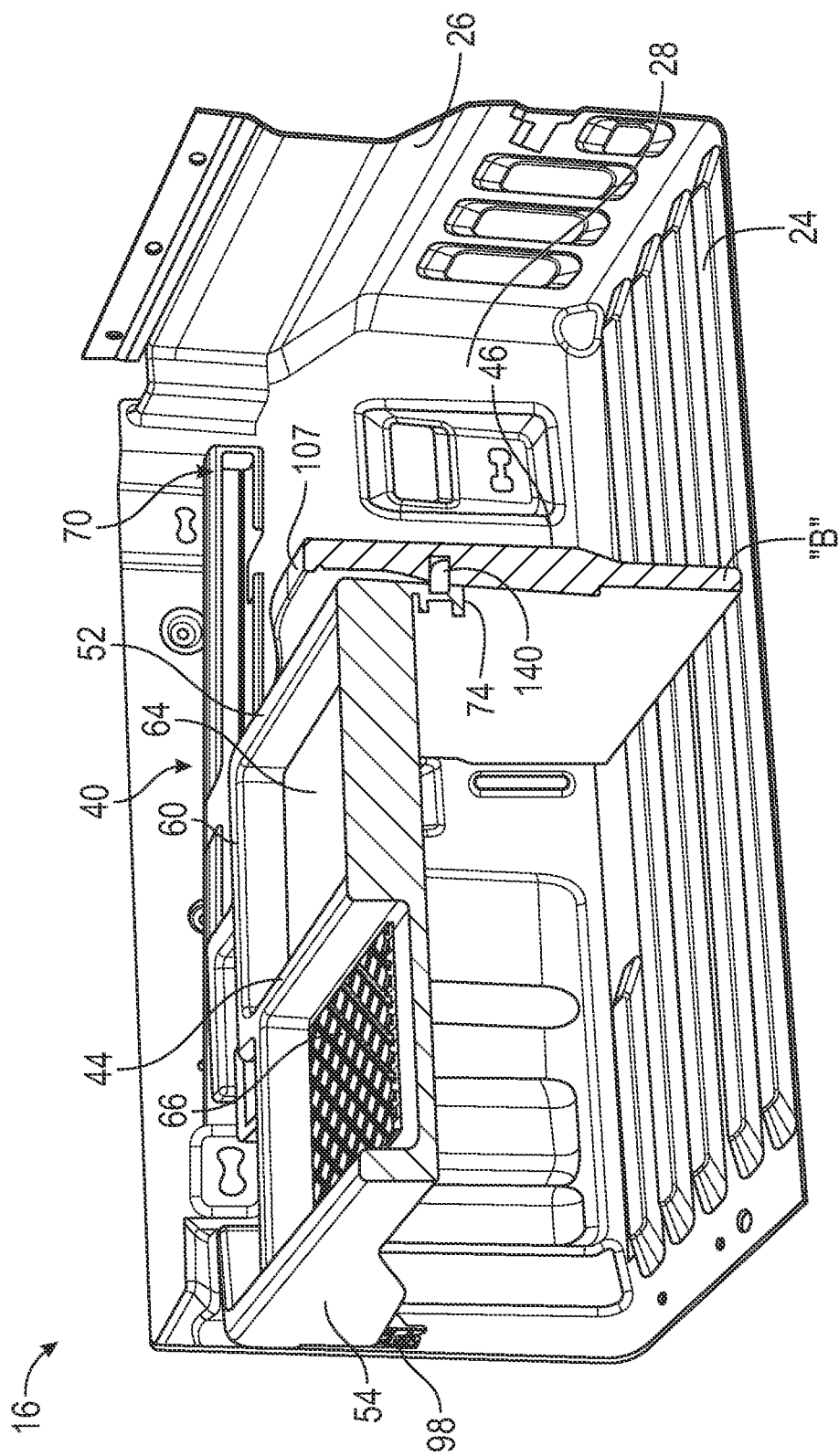
FIG. 3 depicts an upper right partially cut away rear view of a cargo box of the pickup truck of FIG. 1 showing the reconfigurable divider system in a second configuration, in accordance with a non-limiting example.

As will become more fully evident herein, divider system 40 may be arranged in a first configuration "A" (FIG. 2), in which cargo box 16 is fully enclosed and in a second configuration "B" (FIG. 3) in which a first or forward portion of cargo box 16 is exposed and a second or rear portion of cargo box 16 is fully enclosed. Divider system 40 may also be arranged in a third configuration (not shown) in which cargo box 16 is fully exposed. In the third configuration, divider system 40 is not installed in cargo box 16. Referring to FIGS. 2 and 3 and with continued reference to FIG. 1, divider system 40 includes a first member 44 and a second member 46.

Figure 5:
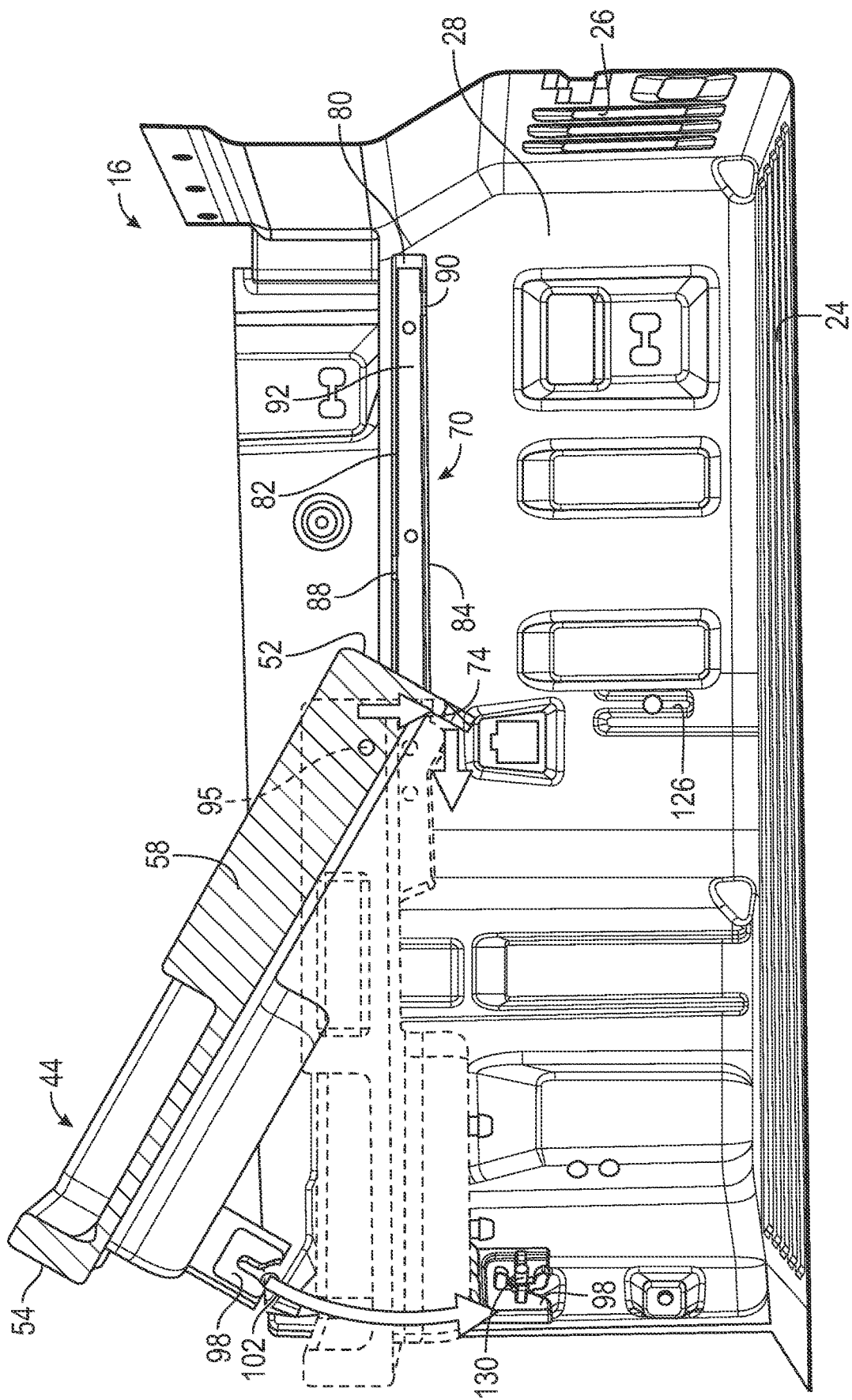
FIG. 5 is a glass side view of a first member of the reconfigurable divider system being installed into the cargo box of FIG. 1, in accordance with a non-limiting example.

In a non-limiting example, first member 44 includes a first end 52, a second end 54, a first side 56 and a second side 58 (FIG. 5). First member 44 is shown to include an outer or upper surface 60 provided with a plurality of compartments, one of which is indicated at 64. At least one of the plurality of compartments 64 is provided with a retainer or net 66. First member 44 is selectively supported in cargo box 16 between a first rail 70 mounted to first side wall 28 and a second rail 72 (FIG. 1) mounted to second side wall 30 as will be detailed more fully herein. In a non-limiting example, first end 52 is shown to include a lock element 74 (FIG. 5) which, as will be detailed herein, secures second member 46 to first member 44 in cargo box 16.

Figure 4:
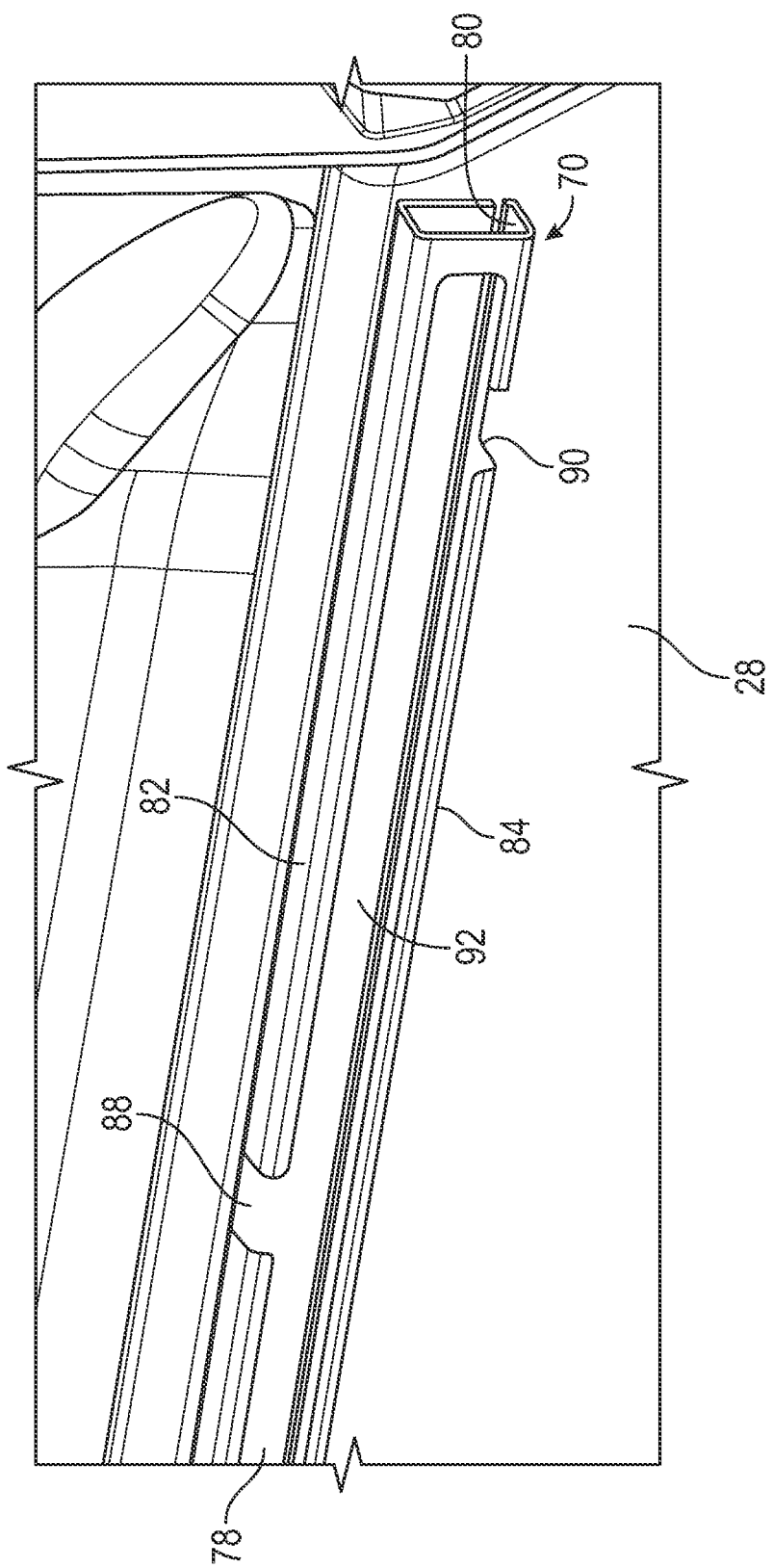
FIG. 4 depicts a divider support rail mounted to a side wall of the cargo box of FIG. 1, in accordance with a nonlimiting example.

Reference will now follow to FIG. 4 in describing first rail 70 with an understanding that second rail 72 includes similar structure. First rail 70 includes a first terminal end 78 and a second terminal end 80. First rail 70 also includes an upper surface 82 and a lower surface 84. Upper surface 82 includes a first opening or gap 88 and lower surface 84 includes a second opening or gap 90. First opening 88 and second opening 90 provide access for structure on first member 44 and second member 46 to a guide track 92 extending between upper surface 82 and lower surface 84.

In a non-limiting example illustrated in FIG. 5, first member 44 includes a first guide pin 95 extending from first side 56 adjacent first end 52 and a second guide pin 96 extending from second side 58 adjacent to first end 52. First member 44 also includes a first lock receiver 98 arranged at second end 54 at first side 56 and a second lock receiver 100 (FIG. 10) arranged at second side 58 at second end 54. Each lock receiver 98, 100 includes an opening 102 such as shown on first lock receiver 98 in FIG. 5. In a non-limiting example, first guide pin 95 may be guided into guide track 92 via first opening 88. Similarly, the second guide pin 96 may be guided in to second rail 72. At this point, first member 44 may be rotated and supported at second end 54 as will be detailed herein.

Figure 6:
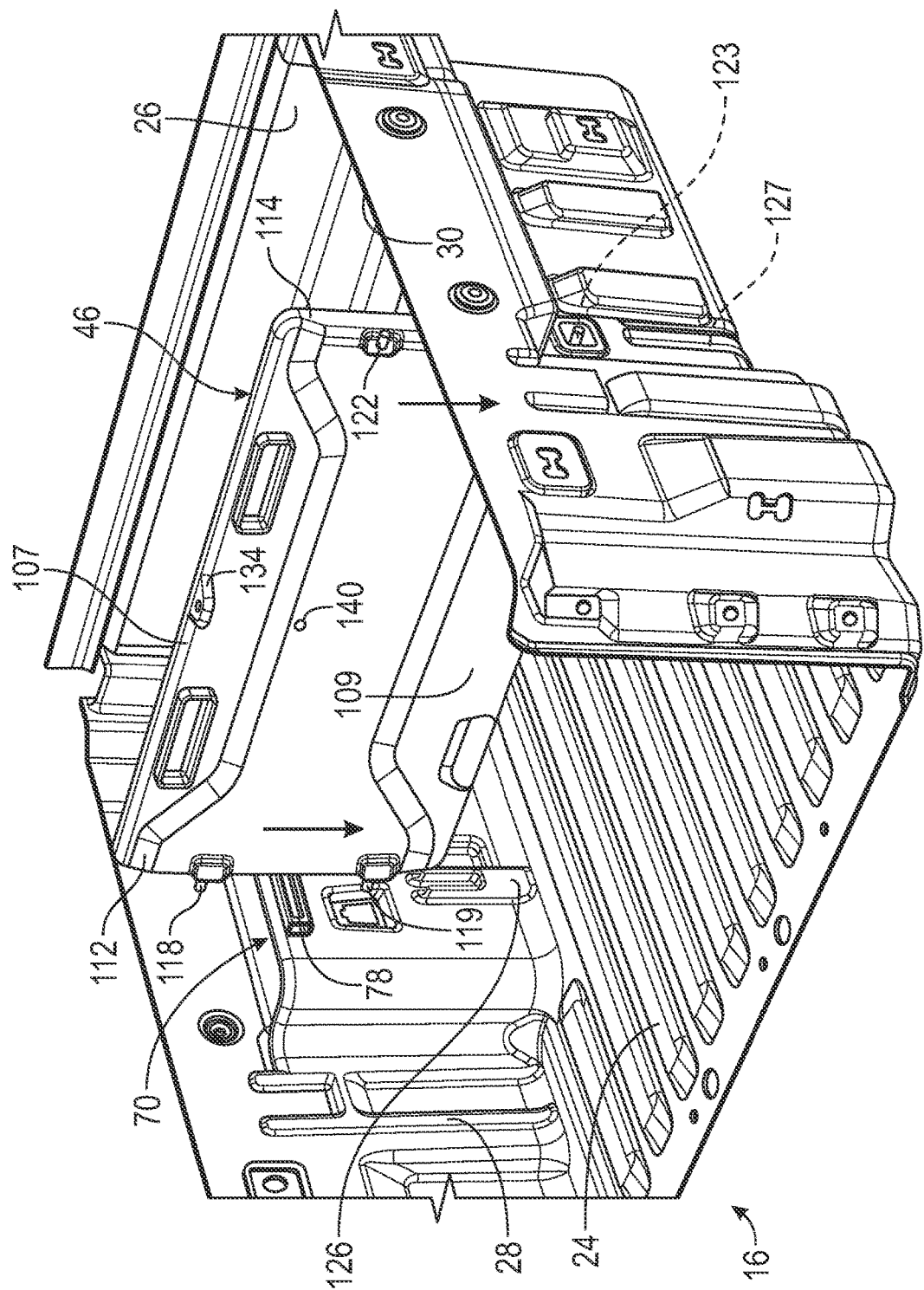
FIG. 6 is a right rear view of a second member of the reconfigurable divider system being installed into the cargo box of FIG. 1, in accordance with a non-limiting example.
Figure 7:
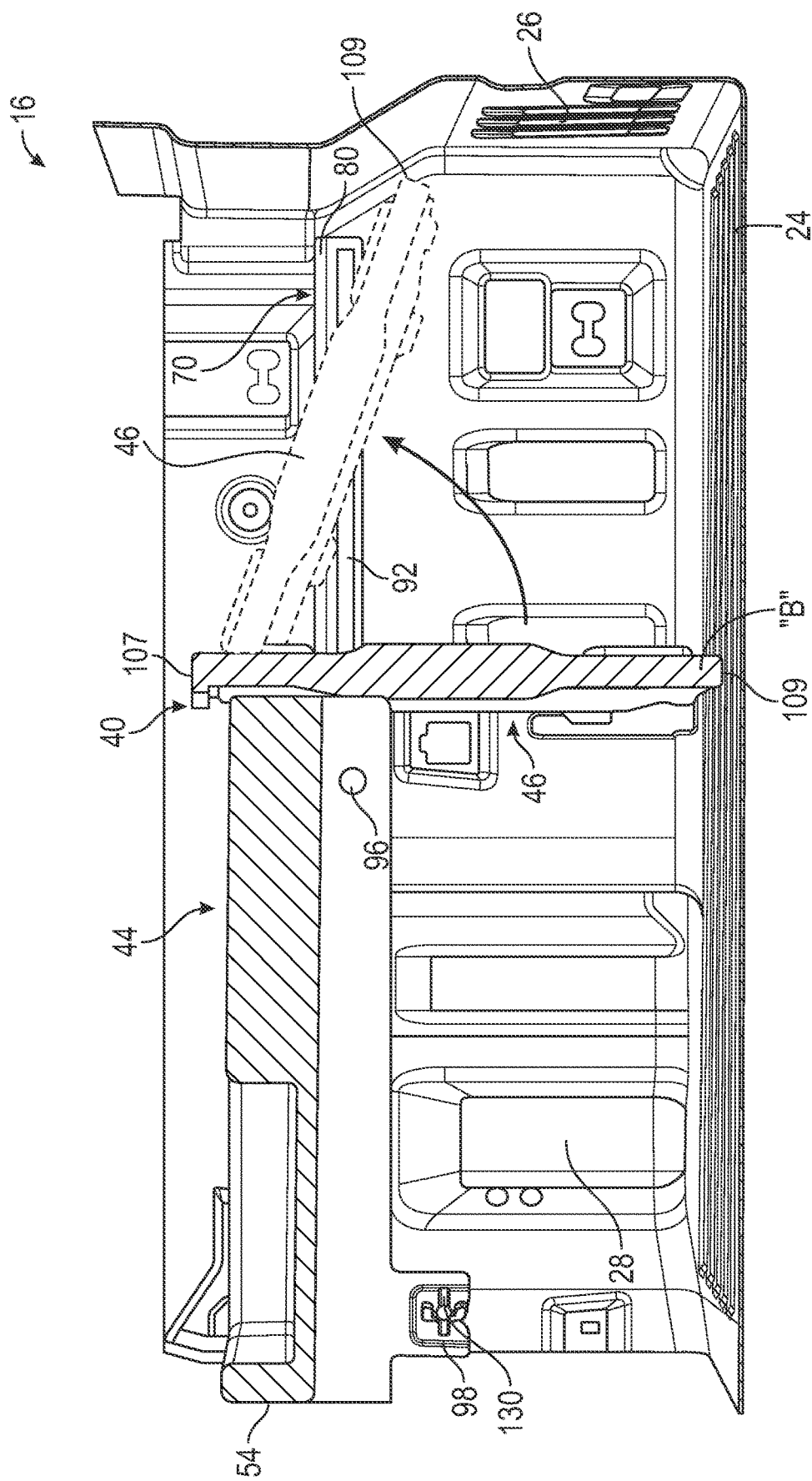
FIG. 7 illustrates the second member being shifted into a first configuration, in accordance with a non-limiting example.

In a non-limiting example shown in FIG. 6, second member 46 includes a first end portion 107, a second end portion 109, a first side surface section 112, and a second side surface section 114. First side surface section 112 supports a first guide pin element 118 and a second guide pin element 119. Second side surface section 114 supports a third guide pin element 122 and a fourth guide pin element 123. In the first configuration, first guide pin element 118 is fitted into first rail 70 and third guide pin element 122 is fitted into second rail 72. Second member 46 may then be rotated such that second guide pin element 119 passes into first rail 70 via second opening 90 and fourth guide pin element 123 passes into second rail 72 in a similar manner as shown in FIG. 7. Thus, repositioning second member 46 may readily transition divider system 40 between the first configuration and the second configuration.

Figure 8:
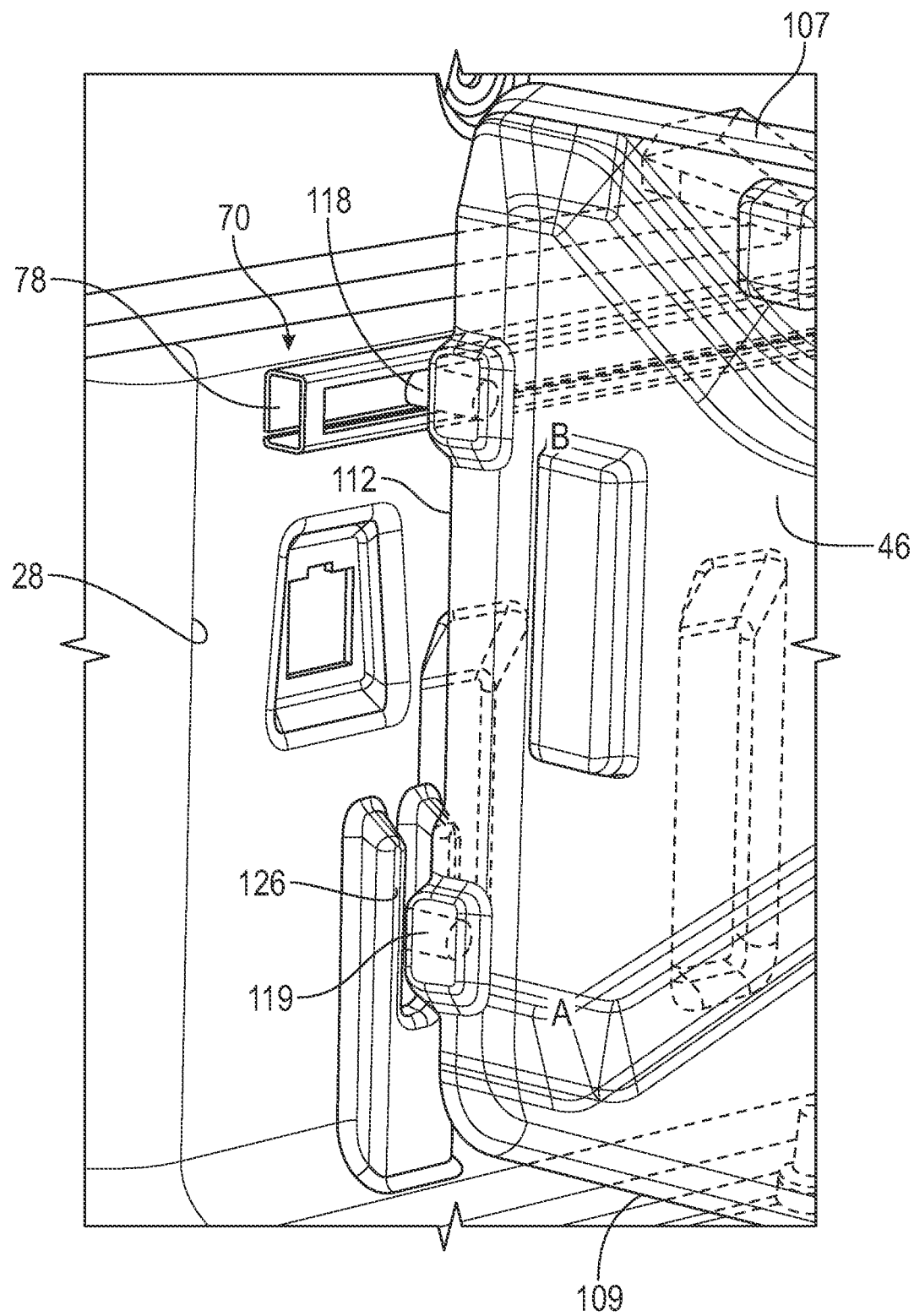
FIG. 8 depicts the second member arranged in a second configuration, in accordance with a non-limiting example.
Figure 9:
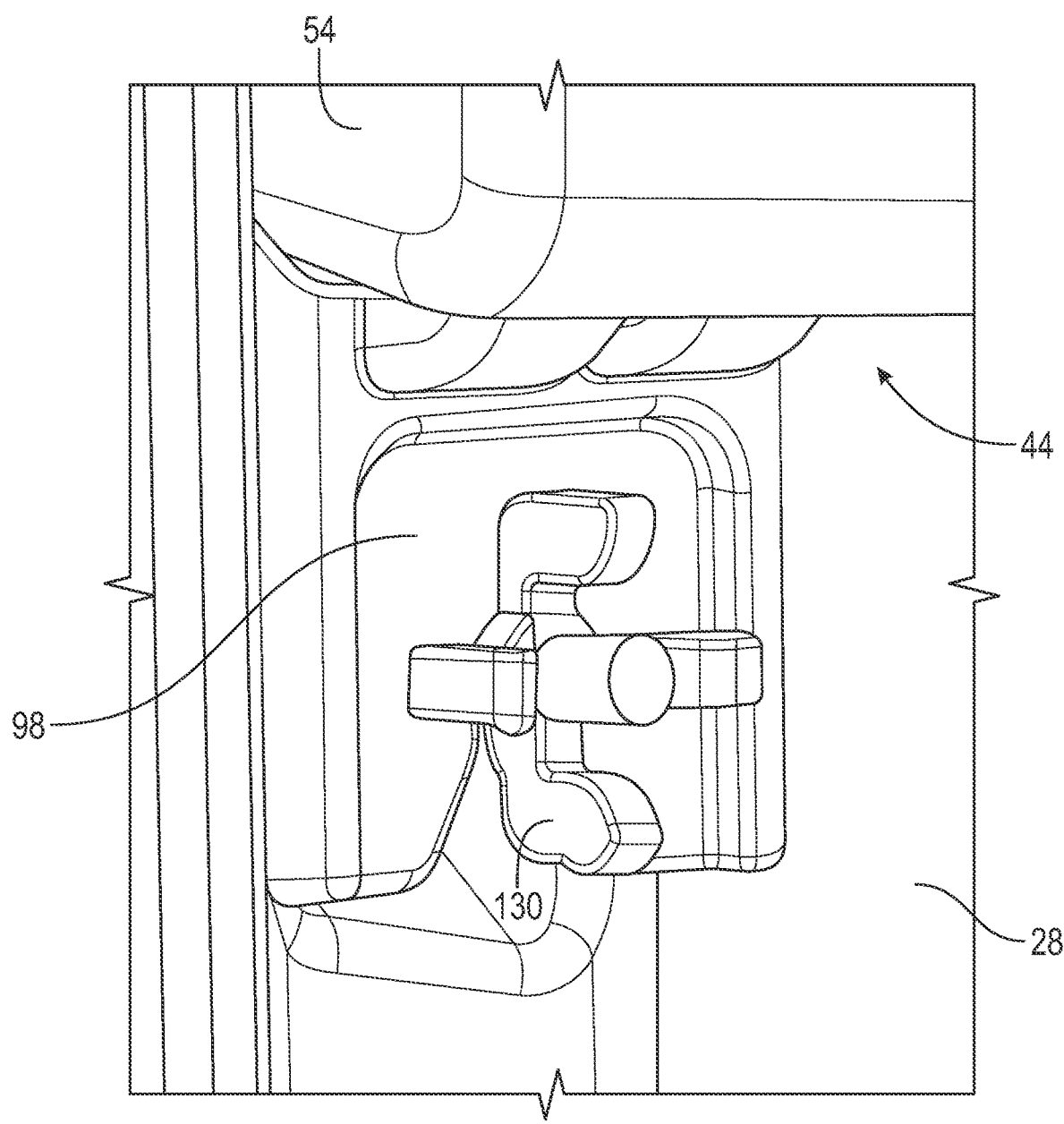
FIG. 9 illustrates a lock member for securing the first member of the reconfigurable divider system to the cargo box, in accordance with a non-limiting example.

In a non-limiting example depicted in FIGS. 8 and 9, in the second or fully enclosed configuration, second guide pin element 119 is position in a first channel 126 formed on first side wall 28 as shown in FIG. 6. Similarly, fourth guide pin element 123 is fitted into a second channel 127 formed on second side wall 30 (FIG. 6). At this point, second member 46 may be shifted toward bed 24 so that first guide pin element 118 passes through first opening 88 into first rail 70 and third guide pin element 122 passes into second rail 72 in a similar manner. With this configuration, a rear portion (not separately labeled) of cargo box 16 is fully exposed while a forward portion (also not separately labeled) of cargo box 16 is accessible only by opening tail gate 32.

In a non-limiting example, first member 44 may be secured to first side wall 28 and second side wall 30. That is, first side wall 28 may support a first lock member 130 and second side wall 30 may support a second lock member 132. First lock me member 130 second lock member 130, 132 may take the form of threaded fasteners or bolts and are positioned near tail gate 32 so as to provide easy access to a user. That is, a user may open tail gate 32 to access first and second lock members 130 and 132. First lock member 130 and second lock members 132 may be engaged by corresponding ones of first and second lock receiver 98 and 100 to secure first member 44 to first side wall 28 and second side wall 30. When secured, both first member 44 and second member 46 may not be removed without accessing tail gate 32.

Figure 10:
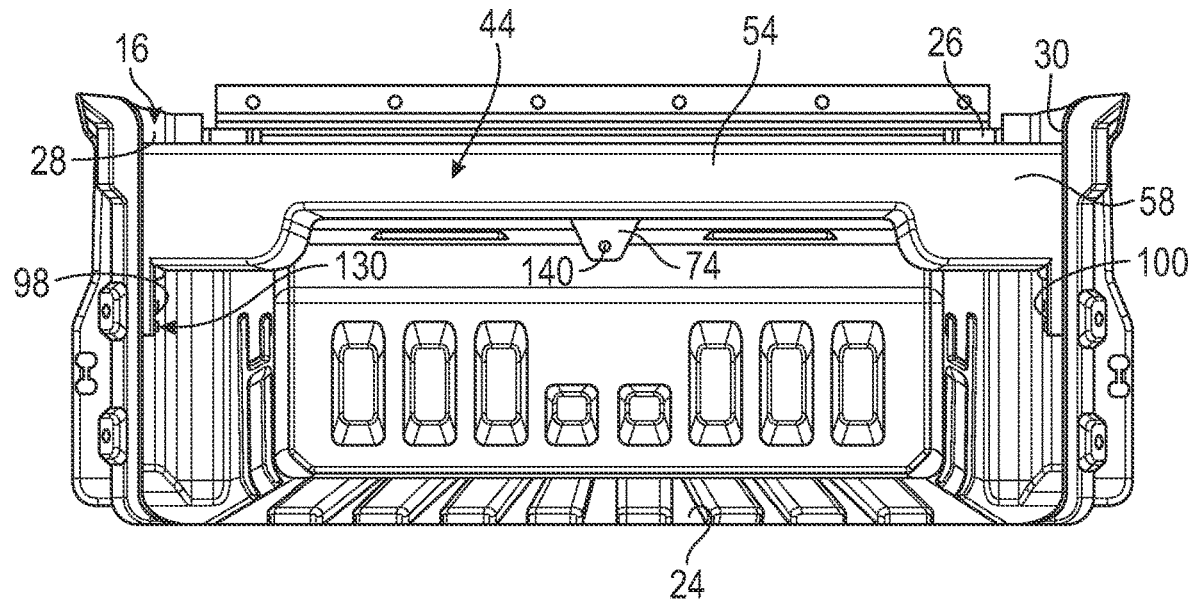
FIG. 10 depicts a rear view of the cargo box of FIG. 1 illustrating a rotatable locking tab on the second member passing into a lock receiving opening on the first member, in accordance with a non-limiting example.
Figure 11:
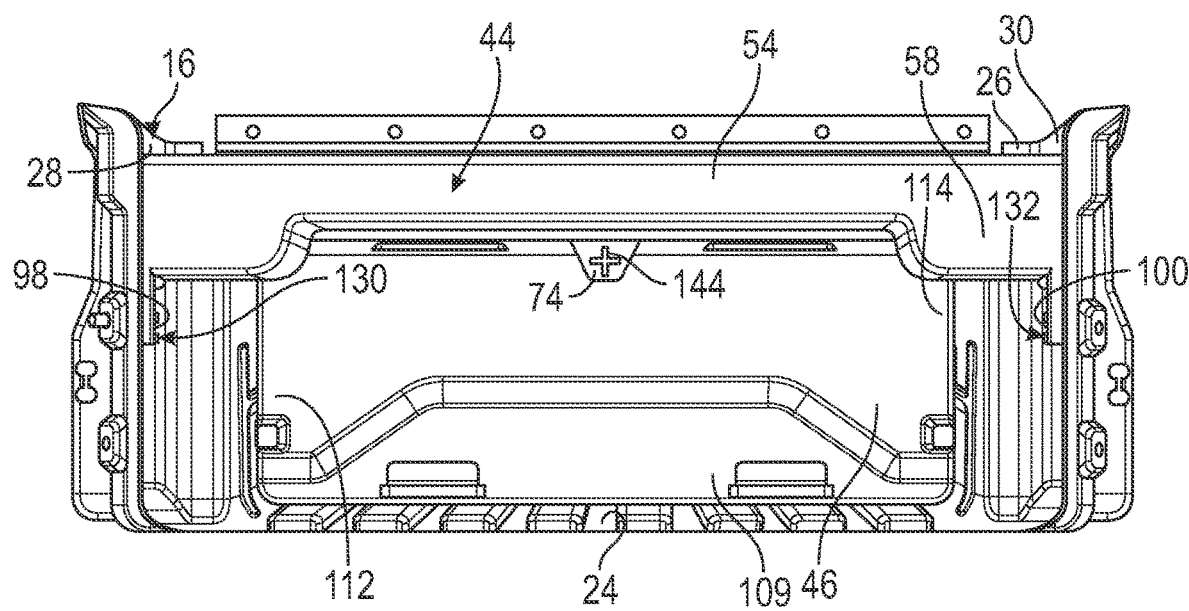
FIG. 11 depicts the rotatable tab member of FIG. 10 rotated to a locking configuration, in accordance with a non-limiting example.

In a non-limiting example, first end portion 107 of second member 46 includes a locking tab 134 and a lock opening 140. In first configuration "A" locking tab 134 registers with lock element 74. A locking member (not shown) may pass through locking tab 134 and lock element 74 to join first member 44 with second member 46. In second configuration "B" lock element 74 aligns with lock opening 140 as shown in FIGS. 3 and 10. A locking member 144 is passed through lock element 74 and engages with lock opening 140 to join first member 44 to second member 46 in the second configuration 'B" as shown in FIG. 11.

At this point, it should be understood that the non-limiting examples described herein can provide users with a number of options for configurating and reconfiguring a pickup truck cargo box. The divider system may be set up in the first configuration, the second configuration, or simply omitted in order to provide various, readily reconfigurable storage options. Further, the first and second members may be made from plastic or other light weight materials to reduce an overall load in the cargo box.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A cargo box for a pickup truck having a divider system comprising:
   a first member selectively supported in the cargo box; and
   a second member selectively supported in the cargo box adjacent the first member,
   wherein the first and second members are configured to selectively establish a first configuration in which the cargo box is fully enclosed and a second configuration in which the cargo box includes a first portion that is fully exposed and a second portion that is fully enclosed,
   wherein the cargo box includes a bed, a forward wall, a first side wall, an opposing second side wall and a tail gate pivotally mounted relative to the bed,
   wherein the tail gate is configured to be selectively opened to provide access to the bed in both the first configuration and the second configuration,
   wherein the first member includes a first side supporting a first lock receiver and a first guide pin and a second side supporting a second lock receiver and a second guide pin,
   wherein the cargo box further comprises a first lock member arranged on the first side wall adjacent the tail gate and a second lock member arranged on the second side wall adjacent the tail gate, and
   wherein the first and second lock receivers are configured to interact with corresponding ones of the first and second lock members to constrain the first member to the cargo box.

2. The cargo box according to claim 1, wherein the first side wall includes a first rail that extends between the forward wall and the tail gate and the second side wall include a second rail that extends between the forward wall and the tail gate, wherein each of the first member and the second member is received in the first and second rails in the first configuration and the first member is slidingly received in the first and second rails in the second configuration.

3. The cargo box according to claim 1, wherein, in the second configuration, the first member is parallel to the bed and the second member is parallel to the tail gate.

4. A cargo box for a pickup truck having a divider system comprising:
   a first member selectively supported in the cargo box; and
   a second member selectively supported in the cargo box adjacent the first member,
   wherein the first and second members are configured to establish a first configuration in which the cargo box is fully enclosed and a second configuration in which the cargo box includes a first portion that is fully exposed and a second portion that is fully enclosed,
   wherein the cargo box includes a bed, a forward wall, a first side wall, an opposing second side wall and a tail gate pivotally mounted relative to the bed,
   wherein the tail gate is configured to be selectively opened to provide access to the bed in both the first configuration and the second configuration,
   wherein the first side wall includes a first rail that extends between the forward wall and the tail gate and the second side wall include a second rail that extends between the forward wall and the tail gate, wherein each of the first member and the second member is received in the first and second rails in the first configuration and the first member is slidingly received in the first and second rails in the second configuration and wherein the first side wall includes a first channel that extends perpendicularly to the bed and the second wall includes a second channel that extends perpendicularly to the bed, the second member being received within each of the first channel and the second channel in the second configuration.

5. The cargo box according to claim 4, wherein each of the first channel and the second channel are formed in corresponding ones of the first side wall and the second side wall.

6. The cargo box according to claim 4, wherein the second member includes a first side surface section supporting a first guide pin element and a second guide pin element, and a second side surface section supporting s third guide pin element and a fourth guide pin element.

7. The cargo box according to claim 6, wherein the first guide pin element and the second guide pin element are arranged in the first rail and the third guide pin element and the fourth guide pin element are arranged in the second rail when the second member is in the first configuration.

8. The cargo box according to claim 6, wherein the first guide pin element is arranged in the first rail and the second guide pin element is arranged in the first channel and the third guide pin element is arranged in the second rail and the fourth guide pin element is arranged in the second channel when the second member is in the second configuration.

9. The cargo box according to claim 4,
wherein the cargo box further comprises a first lock member arranged on the first side wall adjacent the tail gate and a second lock member arranged on the second side wall adjacent the tail gate.

10. The cargo box according to claim 9, wherein the first member includes a first side supporting a first lock receiver and a first guide pin and a second side supporting a second lock receiver and a second guide pin, wherein the first and second lock receivers are configured to interact with corresponding ones of the first and second lock members to constrain the first member to the cargo box.

11. A pickup truck comprising:
a passenger compartment;
a cargo box operatively connected to the passenger compartment; and
a divider system selectively positionable in the cargo box, the divider system including a first member and a second member,
wherein the first and second members are configured to selectively establish a first configuration in which the cargo box is fully enclosed and a second configuration in which the cargo box includes a first portion that is fully exposed and a second portion that is fully enclosed,
wherein the cargo box includes a bed, a forward wall, a first side wall, an opposing second side wall and a tail gate pivotally mounted relative to the bed,
wherein the tail gate is selectively opened to provide access to the bed in both the first configuration and the second configuration,
wherein the cargo box further comprises a first lock member arranged on the first side wall adjacent the tail gate and a second lock member arranged on the second side wall adjacent the tail gate,
wherein the first member includes a first side supporting a first lock receiver and a first guide pin and a second side supporting a second lock receiver and a second guide pin,
wherein the first and second lock receivers are configured to interact with corresponding ones of the first and second lock members to constrain the first member to the cargo box.

12. The pickup truck according to claim 11, wherein the first side wall includes a first rail that extends between the forward wall and the tail gate and the second side wall include a second rail that extends between the forward wall and the tail gate, wherein each of the first member and the second member is received in the first and second rails in the first configuration and the first member is slidingly received in the first and second rails in the second configuration.

13. The pickup truck according to claim 11, wherein, in the second configuration, the first member is parallel to the bed and the second member is parallel to the tail gate.

14. A pickup truck comprising:
a passenger compartment;
a cargo box operatively connected to the passenger compartment; and
a divider system selectively positionable in the cargo box, the divider system including a first member and a second member,
wherein the first and second members are configured to selectively establish a first configuration in which the cargo box is fully enclosed and a second configuration in which the cargo box includes a first portion that is fully exposed and a second portion that is fully enclosed,
wherein the cargo box includes a bed, a forward wall, a first side wall, an opposing second side wall and a tail gate pivotally mounted relative to the bed,
wherein the tail gate is selectively opened to provide access to the bed in both the first configuration and the second configuration,
wherein the first side wall includes a first rail that extends between the forward wall and the tail gate and the second side wall include a second rail that extends between the forward wall and the tail gate,
wherein each of the first member and the second member is received in the first and second rails in the first configuration and the first member is slidingly received in the first and second rails in the second configuration, and
wherein the first side wall includes a first channel that extends perpendicularly to the bed and the second wall includes a second channel that extends perpendicularly to the bed, the second member being received between the first channel and the second channel in the second configuration.

15. The pickup truck according to claim 14, wherein each of the first channel and the second channel are formed in corresponding ones of the first side wall and the second side wall.

16. The pickup truck according to claim 14, wherein the second member includes a first side surface section supporting a first guide pin element and a second guide pin element, and a second side surface section supporting s third guide pin element and a fourth guide pin element.

17. The pickup truck according to claim 16, wherein the first and second guide pin elements are arranged in the first rail and the third and fourth guide pin elements are arranged in the second rail when the second member is in the first configuration.

18. The pickup truck according to claim 16, wherein the first guide pin element is arranged in the first rail and the second guide pin element is arranged in the first channel and the third guide pin element is arranged in the second rail and the fourth guide pin element is arranged in the second channel when the second member is in the second configuration.

19. The pickup truck according to claim 14, further comprising a first lock member arranged on the first side wall adjacent the tail gate and a second lock member arranged on the second side wall adjacent the tail gate.

20. The pickup truck according to claim 19, wherein the first member includes a first side supporting a first lock receiver and a first guide pin and a second side supporting a second lock receiver and a second guide pin, wherein the first and second lock receivers are configured to interact with corresponding ones of the first and second lock members to constrain the first member to the cargo box.

* * * * *